April 9, 1957 W. J. LUER, JR 2,788,279
SAUSAGE CASING AND METHOD FOR HANDLING, STUFFING
AND COOKING SAUSAGE
Filed Dec. 4, 1956 3 Sheets-Sheet 3
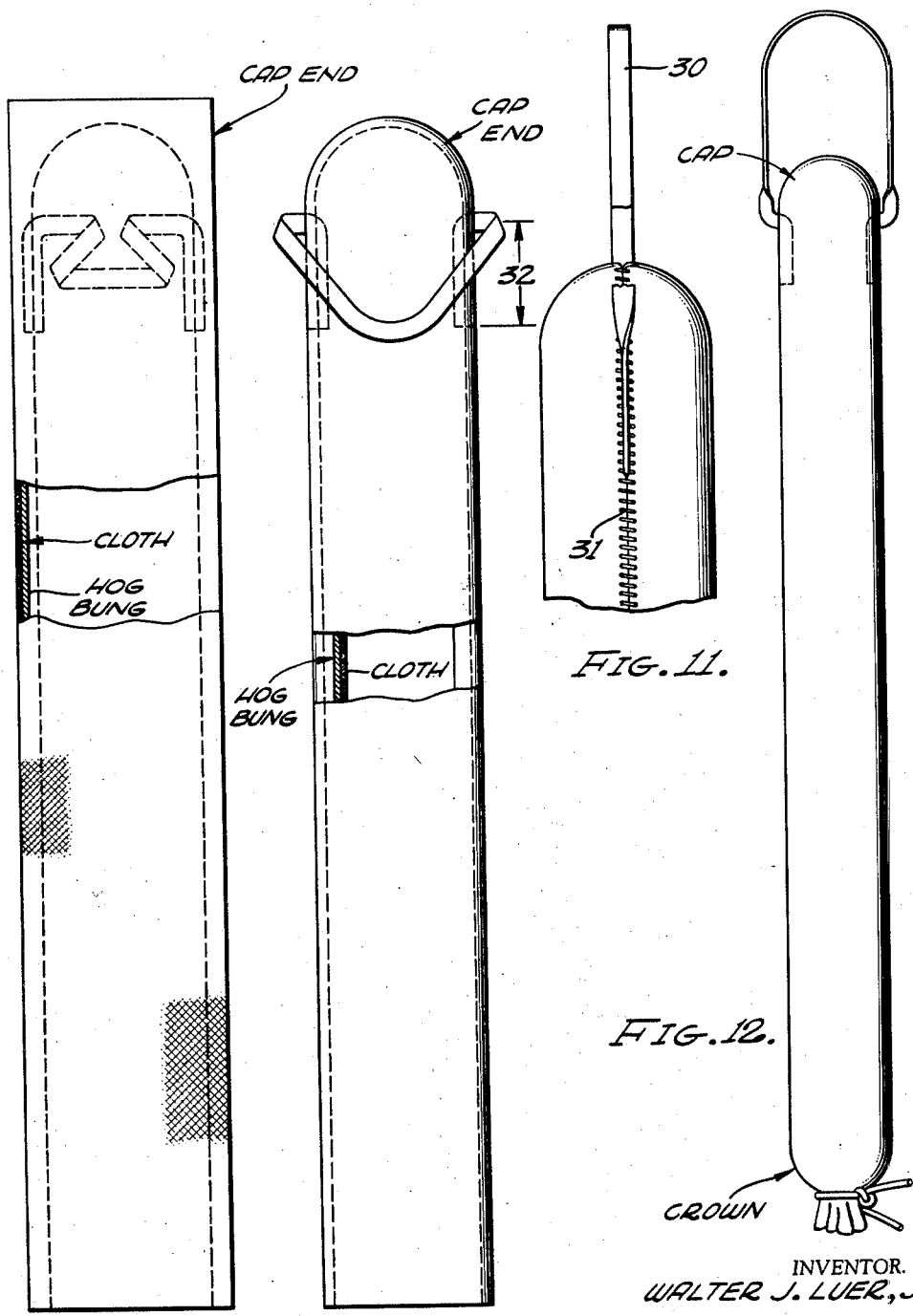
INVENTOR.
WALTER J. LUER, JR.
BY
ATTORNEYS

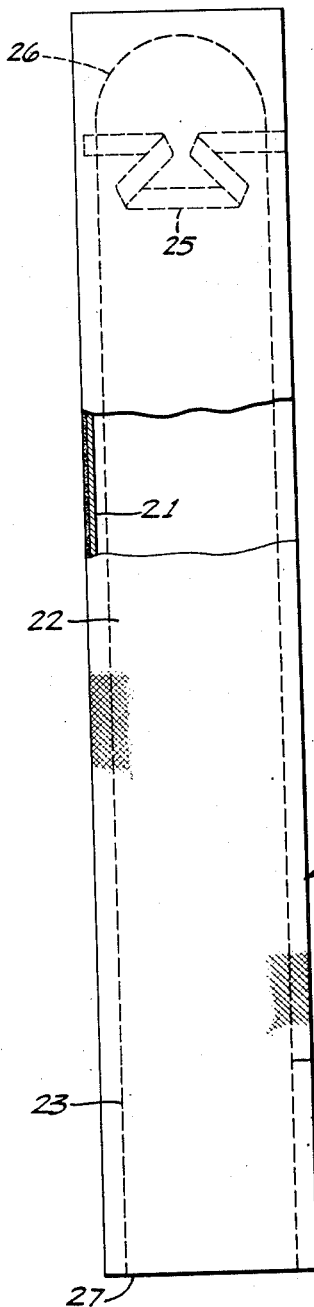
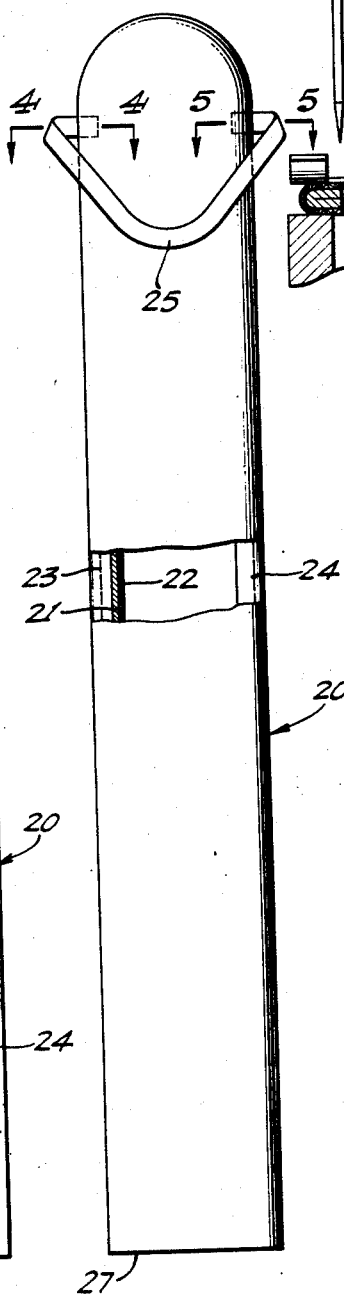
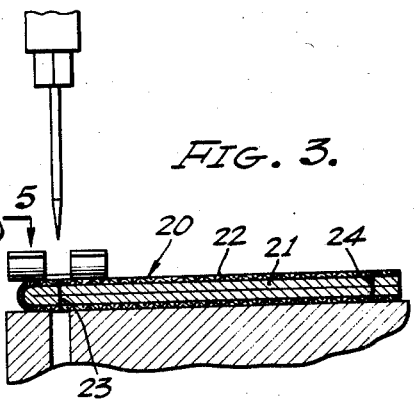
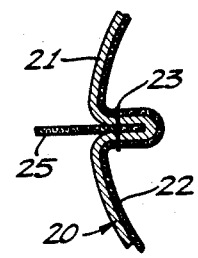
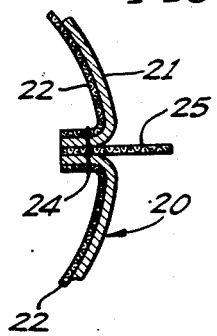

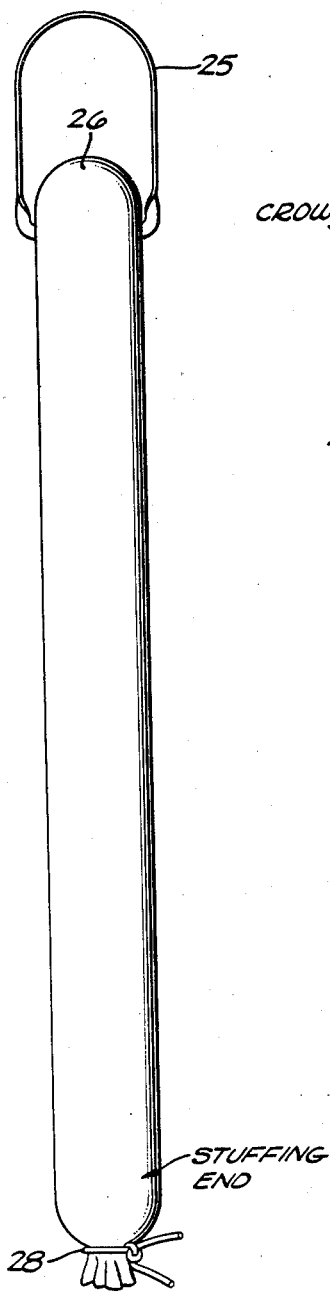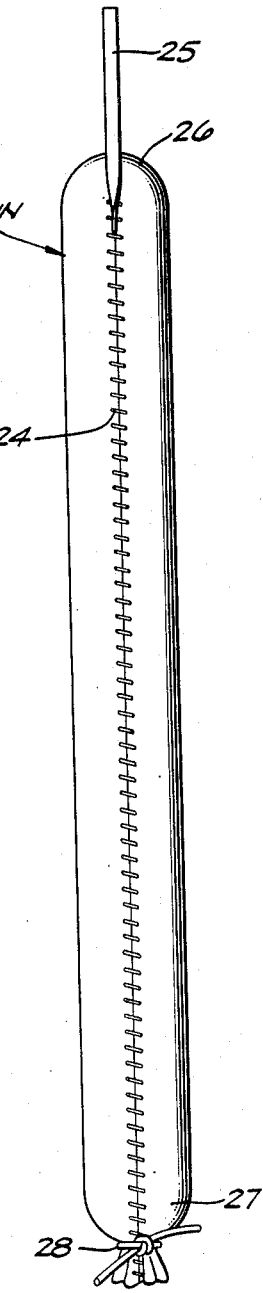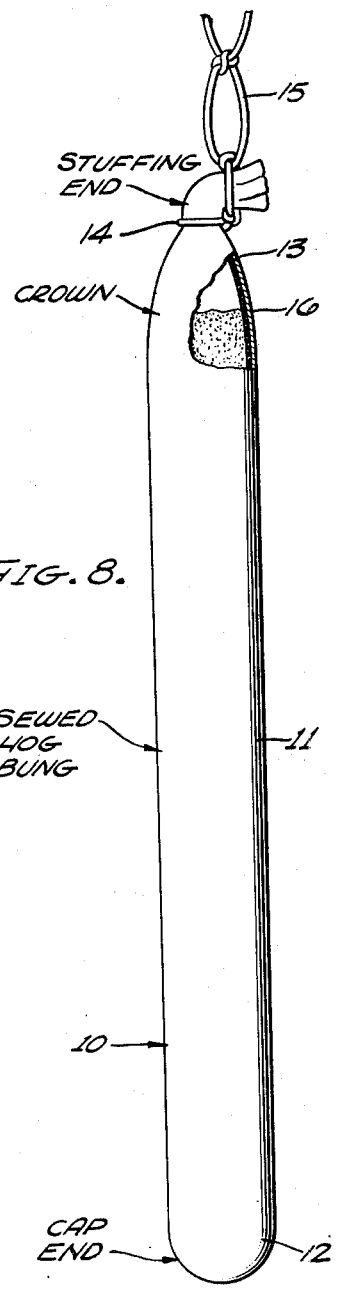

United States Patent Office 2,788,279
Patented Apr. 9, 1957

2,788,279

SAUSAGE CASING AND METHOD FOR HANDLING, STUFFING, AND COOKING SAUSAGE

Walter J. Luer, Jr., Los Angeles, Calif., assignor to Luer Packing Company, Los Angeles, Calif., a corporation of Delaware Application December 4, 1956, Serial No. 626,111

9 Claims. (Cl. 99—109)

This invention relates to a sausage casing and to a method of stuffing, cooking and handling sausage. The present invention is directed to the type of sausage employing a sewed bung such as braunschweiger and the like.

This application is a continuation-in-part of applicant's co-pending application, Serial No. 552,427, filed December 12, 1955, now abandoned.

In conventional practice of stuffing a sewed bung to form sausage, when the sausage is hung for smoking the bung will stretch, particularly at the crown end resulting in a loosely-packed upper end or an empty section which is waste.

It is an object of the present invention to provide means and method forming such sausage which prevents such stretch in the bung and thereby lessens waste.

It is a further object of the present invention to provide means and method of forming a sausage which gives an improved quality in the product with better uniformity.

It is a further object of the present invention to provide means and method of forming such sausage which results in a minimization of the handling of the sausage in the processing thereof with a resultant labor saving.

It is a further object of the present invention to provide means and method of forming a sausage which permits cooking of the sausage by steaming with the sausage hung, thus permitting an elimination of the conventional cooking in water.

The optimum advantages of this invention are secured when the strap for supporting the sewed bung is secured adjacent the crown end of the bung and stuffing is toward the crown end. However, conventional practice calls for stuffing against the cap end leaving the crown end open for inspection. In cases where it is desired to continue this practice, the invention may be utilized and a large proportion of the advantages obtained by securing the strap longitudinally in the seam adjacent the cap end of the bung as illustrated in the alternative embodiment described hereinafter.

These and other objects, features and advantages will be apparent from the annexed specification, in which:

Figure 1 is a side view partly in section and with parts broken away for clarity of illustration of a sewed bung formed in accordance with the present invention prior to inverting the same.

Figure 2 is a view similar to Figure 1 of the inverted bung prior to stuffing.

Figure 3 is a fragmentary section through a bung being stitched.

Figure 4 is a fragmentary section taken along the line 4—4 of Figure 2.

Figure 5 is a fragmentary section taken along the line 5—5 of Figure 2.

Figure 6 is a front view of a stuffed bung formed in accordance with the present invention.

Figure 7 is a side view of the bung shown in Figure 6.

Figure 8 is a front view of a conventional sausage.

Figure 9 is a side view partly in section and with parts broken away for clarity of illustration of a sewed bung formed in accordance with an alternative embodiment of the present invention prior to inverting the same.

Figure 10 is a view similar to Figure 9 of the inverted bung prior to a stuffing.

Figure 11 is a fragmentary side view of the bung shown in Figure 10; and

Figure 12 is a front view of the bung shown in Figure 10 after stuffing.

Referring now more particularly to the drawings and particularly to Figure 8, there is shown a conventional sewed bung sausage indicated generally by the numeral 10. This sausage consists of a lined hog bung 11 sewed together along a continuous seam to provide a cap end 12 and a crown end 13. This bung is conventionally tied as at 14, to which tie is affixed a string 15 providing a loop for hanging the sausage.

After stuffing, this conventional sausage 10 is cooked in water and then hung in a smoke room. During the hanging of the sausage, the bung 11 will stretch, resulting in a stretch particularly as at 16 in the crown, resulting in a loose pack at the upper end of the sausage, providing voids and resulting in waste.

The above-outlined process wherein the bung is stuffed on the stuffing table, transferred to a cooking vat, removed from the vat, washed, transferred to a smoke house and hung for smoking requires considerable labor, and such repeated handling results in an undesirable amount of breakage of the sausage.

Referring now more particularly to Figures 1 through 7, there is shown an improved sausage casing 20 comprising a bung section 21 and a liner 22 preferably formed of a paper-like material. The liner 22 and bung 21 are stitched together by sewing as at the seams 23 and 24. A strap 25 is sewn in the casing by placing the ends of the same between the folds of the bung prior to stitching as is particularly illustrated in Figures 4 and 5. After sewing the sausage casing as above-described, the same is inverted as indicated in Figure 2. This places the liner 22 on the inside and results in placing the strap 25 on the outside of the sausage casing. It will be noted that the strap 25 is affixed to the sausage casing at the seams 23 and 24. It will be noted that as shown in the drawings, the strap 25 is affixed in the seams 23 and 24 adjacent but spaced slightly inwardly from the crown end of the casings. With a sausage casing thus sewn, the rounded, closed and seamed end 26 becomes the crown, and the open or stuffing end 27 becomes the cap which is tied off with string after stuffing as at 28.

The strap 25 replaces the string 15 and by reason of the fact that all of the weight of the sausage transferred to the strap 25 when the sausage is hung is supported directly on the seams 23 and 24, stretching of the bung is substantially eliminated or greatly lessened.

As a result of the foregoing, after the sausage is stuffed and tied, it may be immediately hung upon a tree where it remains for all of the subsequent operations including steaming, cooking, smoking, chilling etc. As compared to conventional handling, this means that the following steps are eliminated: The placing of the stuffed sausage in a truck, removal from the truck, placing in a cooking vat and removing from the vat prior to hanging on the smoking tree.

Referring now more particularly to Figures 9 through 12, there is shown an alternative embodiment of the present invention in which the strap herein designated by the numeral 30 is inserted in the seam 31 longitudinally so that a length of strap designated by the dimension 32 is actually stitched in the seam. The dimension 32 in practice should preferably be in the neighborhood from 2½ to 3 inches. The strap is affixed in the seam adjacent, but spaced slightly inwardly (in practice about 2½ inches), from the end of the casing. This embodiment otherwise differs chiefly from the embodiment previously described in that the strap is affixed to the casing adjacent the cap rather than the crown end, as the cap end of the bung is weaker than the crown, and the additional length 32 of the strap is extended longitudinally in the seam in order to procure a distribution of the weight of the sausage when hung along the seam to reduce breakage at the cap end. This embodiment of the invention sacrifices one of the advantages of the previous embodiment, i. e. that of reducing rupture on stuffing and subsequent handling inherent upon filling the sausage toward the stronger end of the casing, i. e. the crown end. It, however, does not involve more breakage or rupture than in conventional practice, and it does result in tying at the crown end, as shown in Figure 12, which will permit inspection at the crown end which is conventional.

While there has been described what is at present considered the preferred embodiment of the invention, it will be understood that various changes and alterations may be made therein without departing from the essence of the invention, and it is intended to cover herein all such changes and alterations as come within the true spirit and scope of the annexed claims.

I claim:

1. The method of manufacturing sausage comprising stuffing a sausage casing consisting of a bung section and a liner sewed together along a pair of seams; a strap inserted between said section and liner and having its ends stitched therein adjacent but spaced slightly inwardly from the crown end of said casing whereby upon inversion of said casing said strap affords a support for a sausage with the weight thereof supported directly on said seams; tying the open end of said casing; and directly hanging said sausage on a smoke tree for subsequent cooking and smoking; said sausage casing before filling being closed at the crown end and open at the cap end, said casing being filled from said open end toward said closed crown end.

2. The method of manufacturing sausage comprising stuffing a sausage casing consisting of a bung section and a liner sewed together along a pair of seams, a supporting strap for said casing, said strap being arranged to support a sausage in said casing, when hung, directly on said seams; said strap being secured to said casing adjacent but spaced slightly inwardly from the crown end of said casing; tying the open end of said casing; and directly hanging said sausage on a smoke tree for subsequent cooking and smoking; said sausage casing before filling being closed at the crown end and open at the cap end, said casing being filled from said open end toward said closed crown end.

3. The method of manufacturing sausage comprising stuffing a sausage casing consisting of a bung section and a liner sewed together along a pair of seams; a strap inserted between said section and liner and having its ends stitched therein whereby upon inversion of said casing said strap affords a support for a sausage with the weight thereof supported directly on said seams; said strap being secured to said casing adjacent but spaced slightly inwardly from the crown end of said casing; tying the open end of said casing; and directly hanging said sausage on a smoke tree for subsequent steam cooking and smoking; said sausage casing before filling being closed at the crown end and open at the cap end, said casing being filled from said open end toward said closed end.

4. The method of manufacturing sausage comprising stuffing a sausage casing consisting of a bung section and a liner sewed together along a pair of seams, a supporting strap for said casing, said strap being arranged to support a sausage in said casing, when hung, directly on said seams; said strap being secured to said casing adjacent but spaced slightly inwardly from the crown end of said casing; tying the open end of said casing; and directly hanging said sausage on a smoke tree for subsequent steam cooking and smoking; said sausage casing before filling being closed at the crown end and open at the cap end, said casing being filled from said open end toward said closed crown end.

5. A sausage casing comprising a bung section and a liner sewed together along a pair of seams; a strap inserted between said section and liner and having its ends stitched therein whereby upon inversion of said casing said strap affords a support for a sausage with the weight thereof supported directly on said seams; said strap being secured to said casing adjacent but spaced slightly inwardly from the crown end of said casing.

6. A sausage casing comprising a bung section and a liner sewed together along a pair of seams; a strap inserted between said section and liner and having its ends stitched therein whereby upon inversion of said casing said strap affords a support for a sausage with the weight thereof supported directly on said seams; said strap being secured to said casing adjacent but spaced slightly inwardly from the crown end of said casing; said casing prior to filling being closed at the crown end and open at the cap end.

7. A sausage casing comprising a bung section and a liner sewed together along a pair of seams; a strap inserted between said section and liner and having its ends stitched therein whereby upon inversion of said casing said strap affords a support for a sausage with the weight thereof supported directly on said seams; said strap being secured to said casing adjacent but spaced slightly inwardly from one end of said casing.

8. A sausage casing comprising a bung section and a liner sewed together along a pair of seams; a strap inserted between said section and liner and having a portion thereof stitched in said seam longitudinally thereof and emerging from said casing adjacent but slightly inwardly from one end of said casing whereby upon inversion of said casing, said strap affords a support for a sausage with the weight thereof supported directly on the seams.

9. A sausage casing comprising a bung section and a liner sewed together along a pair of seams; a strap inserted between said section and liner and having a portion thereof stitched in said seam longitudinally thereof and emerging from said casing adjacent but spaced slightly inwardly from the cap end of said casing whereby upon inversion of said casing, said strap affords a support for a sausage with the weight thereof supported directly on the seams.

References Cited in the file of this patent

UNITED STATES PATENTS

| | | |
|---|---|---|
| 1,690,779 | Frey | Nov. 6, 1928 |
| 1,699,076 | Mumm et al. | Jan. 15, 1929 |
| 1,741,239 | Hoy | Dec. 31, 1929 |
| 1,825,528 | Knudsen | Sept. 29, 1931 |
| 1,887,806 | Gall | Nov. 15, 1932 |
| 1,983,681 | Seaver | Dec. 11, 1934 |
| 1,985,564 | Gall | Dec. 25, 1934 |
| 2,655,450 | Ames | Oct. 13, 1953 |
| 2,729,263 | Tipper | Jan. 3, 1956 |